United States Patent
Koehler et al.

(10) Patent No.: US 6,846,030 B2
(45) Date of Patent: Jan. 25, 2005

(54) VEHICLE CLOSURE PANEL WITH TORSION BAR ASSIST AND INTEGRAL VIBRATION DAMPING

(75) Inventors: Duane A. Koehler, Livonia, MI (US); Scott G. Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/710,137

(22) Filed: Jun. 22, 2004

(65) Prior Publication Data

US 2004/0262944 A1 Dec. 30, 2004

Related U.S. Application Data

(63) Continuation-in-part of application No. 10/604,331, filed on Jul. 11, 2003, which is a continuation-in-part of application No. 10/604,075, filed on Jun. 25, 2003, now Pat. No. 6,769,729.

(51) Int. Cl.[7] .............................................. B62D 33/023
(52) U.S. Cl. ................... 296/50; 296/57.1; 296/146.11; 49/386; 16/308
(58) Field of Search .......................... 296/50, 57.1, 60, 296/146.1, 146.8, 146.11; 49/386; 16/308

(56) References Cited

U.S. PATENT DOCUMENTS

| 2,984,517 | A | 5/1961 | Farrow et al. |
| 3,031,225 | A | 4/1962 | Saffer et al. |
| 3,166,783 | A | 1/1965 | Mackie et al. |
| 3,336,070 | A | 8/1967 | Jackson |
| 4,143,904 | A | 3/1979 | Copper et al. |
| 5,358,301 | A | 10/1994 | Konchan et al. |
| 5,988,724 | A | 11/1999 | Wolda |
| 6,637,796 | B1 | 10/2003 | Westerdale et al. |

Primary Examiner—Patricia Engle
(74) Attorney, Agent, or Firm—Gigette M. Bejin

(57) ABSTRACT

An automotive vehicle has a door adapted to pivot about a generally horizontal pivot axis, with the door including a shell defining a space surrounded by the shell. The door is pivoted upon bearings located at each end of the door. A torsion bar lift assist is provided with a vibration and noise isolator and damper, which is engaged about a central portion of the torsion bar. The damper prevents objectionable noise which could otherwise result in the event that the torsion bar strikes the shell of the door because of road-induced vibration.

16 Claims, 3 Drawing Sheets

VEHICLE CLOSURE PANEL WITH TORSION BAR ASSIST AND INTEGRAL VIBRATION DAMPING

This application is a continuation-in-part of Ser. No. 10/604,331, filed Jul. 11, 2003, entitled "Pickup Truck With Lift Assisted Tailgate System", which is a continuation in part of 10/604,075, filed Jun. 25, 2003 now U.S. Pat. No. 6,769,729, entitled "Automotive Tailgate with Lift Assist System—I".

BACKGROUND OF INVENTION

1. Field of the Invention

The present invention relates to a vehicle, such as a pickup truck or sport utility vehicle, having a torsion bar for assisting the closure of a tailgate or other door or closure panel mounted for rotation about a generally horizontal pivot axis.

2. Disclosure Information

Tailgates used with large pickup trucks and sport utility vehicles present a challenge to the motorist insofar as the weight of such tailgates and the height of such vehicles frequently results in the necessity of expending considerable effort to close the tailgate. U.S. Pat. No. 5,358,301, which is illustrated in FIG. 5, discloses a torsion bar system for assisting the closure of a tailgate. Unfortunately, the system disclosed in the '301 patent suffers from several drawbacks. First, the system would have high cost because the torsion bar is itself used as a hinge pin and this necessitates that the torsion bar be sufficiently large to not only function in torsion, but also in shear, so as to support the tailgate itself. Secondly, the fact that the torsion bar functions not only as a torsion element but also as a pivot for tailgate means that in the event that the torsion bar breaks, the tailgate's pivot function may be impaired, with the result that the tailgate could separate from the vehicle in a unwanted manner.

Because a torsion bar according to the present invention may be formed as a relatively thin and flexible member, road-induced vibration could cause audible noise as a result of the torsion bar striking a tailgate or other door to which it has been incorporated. An isolator according to the present invention prevents a "hard" strike of the closure panel by the torsion bar, thereby either eliminating, or at least greatly attenuating, the noise occasioned by the strike.

A torsion bar tailgate lift assist system according to the present invention solves the problems inherent in the previously described prior art system, but at a lower cost, while providing a torsion bar which is full floating, yet quiet during operation of the vehicle. As used herein, the term "full floating" means that if the torsion bar of the present inventive system were to break, the pivoting function and retention of the tailgate to the body of the pickup truck would not be adversely affected for as long as the driver leaves the tailgate upon the vehicle, because the tailgate pivots will function perfectly well without any intervention by the torsion bar.

SUMMARY OF INVENTION

According to the present invention, a closure panel for an automotive vehicle body includes a door adapted to pivot about a generally horizontal pivot axis, with the door having a shell comprised of an outer panel joined with and spaced from an inner panel. A hinge half is attached to a first end of the door shell. The hinge half engages a first pivot post which is rigidly attached to the body. A hinge bearing retainer is attached to a second end of the door and has a bearing insert housed therein. A second pivot post, which is rigidly attached to the body, engages the bearing insert such that the second pivot post and the bearing insert are rotationally locked.

A system according to the present invention further includes a full floating torsion bar having a first end rotationally grounded to the shell of the door and a second end engaged with and rotationally locked with the bearing insert such that the torsion bar will be subjected to torsional loading as the door is pivoted. Finally, a vibration isolator is fitted along at least a portion of the torsion bar extending between said first and second ends. The isolator includes a generally cylindrical sleeve having a central passage for the torsion bar and a plurality of generally annular ribs extending radially outwardly from an outer cylindrical surface of the sleeve.

According to another aspect of the present invention the isolator's generally annular ribs and sleeve may be molded integrally from either an elastomer, or a plastics material, or from other materials known to those skilled in the art and suggested by this disclosure. The isolator may be molded integrally with the torsion bar, or slidingly engaged with the torsion bar after the molding process has been completed. The isolator may be retained by adhesives or other means known to those skilled in the art and suggested by this disclosure.

According to another aspect of the present invention, the isolator may be molded to the torsion bar such that the isolator and torsion bar are rotationally locked to each other. In this case, the vibration snubber incorporated in the isolator may be asymmetrical (e.g., non-circular) and oriented such that the snubber will contact a surface of the door shell when the torsion bar is subjected to excessive vibratory forces arising from road load inputs to the vehicle.

It is an advantage of the present invention that a vehicle tailgate may be provided with a lift assist system having less weight than other known lift assist systems, through the use of a relatively flexible torsion bar subject to vibrational movement.

It is a further advantage of the present invention that the present lift assist system is less costly than known lift assist systems.

The present torsion bar isolator is particularly useful with tailgates having shells extending for less than the full depth of the door for a portion of the vertical dimension of the door. Such doors may employ a torsion bar which extends outside of the door shell, thereby exacerbating the previously described noise problem, and thereby rendering the present noise treatment more needed.

Other advantages, as well as objects and features of the present invention, will become apparent to the reader of this specification.

DETAILED DESCRIPTION

Figure 1:
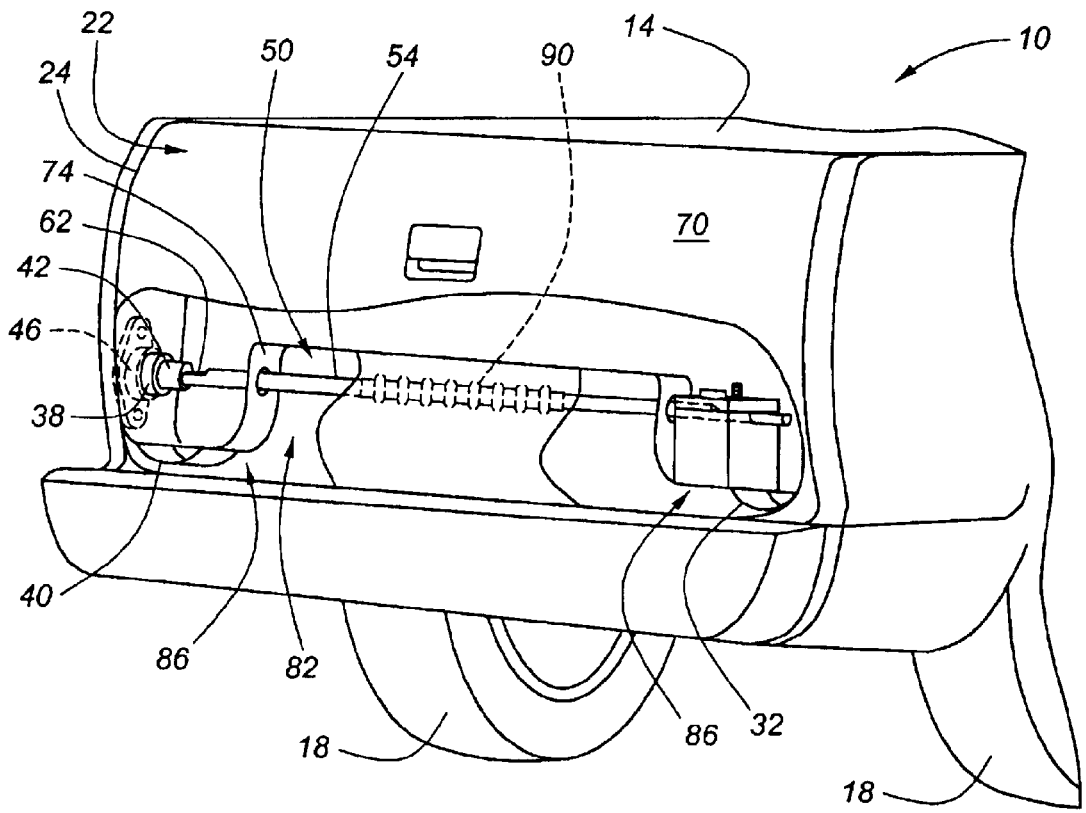
FIG. 1 is a perspective view of a pickup truck having a tailgate lift assist system with a vibration isolator according to the present invention.

As shown in FIG. 1, vehicle 10, which is exemplified as a pickup truck having a box 14, has rear roadwheels 18, and tailgate closure panel 22 including door 24 and torsion bar 50. Note that isolator 90 is applied to a central portion of isolator bar 50. Outer panel 70 and inner panel 74 are formed such that an external recess is provided at a lower portion of door or tailgate 24. Accordingly, raised section 82 of the external recess extends across the central part of door 24, and lowered sections 86 of the external recess extend at both ends of door 24. Those skilled in the art will appreciate in view of this disclosure that the present isolator could be employed with a door 24 consisting of a single panel which does not define an interior space.

Torsion bar 50 has first end 58, which is rotationally grounded to the shell of door 24, inasmuch as pinch block 68, which is attached to right side hinge bracket 32, and which is in turn welded to inner panel 74, captures first end 58. Pinch block 68 may be formed integrally from hinge bracket 32, or could be mechanically joined to bracket 32. Second end 62 of torsion bar 50 is engaged with and rotationally locked with bearing insert 42, which is received within hinge bearing retainer 38, which is attached to left hinge bracket 40. Torsion bar 50 has a torsional reaction section, 54, which extends between ends 58 and 62. Torsional reaction section 54 extends through raised section 82 of the door's external recess. This means that reaction section 54 is actually outside of the shell defined by outer panel 70 and inner panel 74. As a result, vibration-driven impact of reaction section 54 against inner panel 74 could give rise to objectionable noise, were it not for the intervention afforded by isolator 90.

Figure 2:
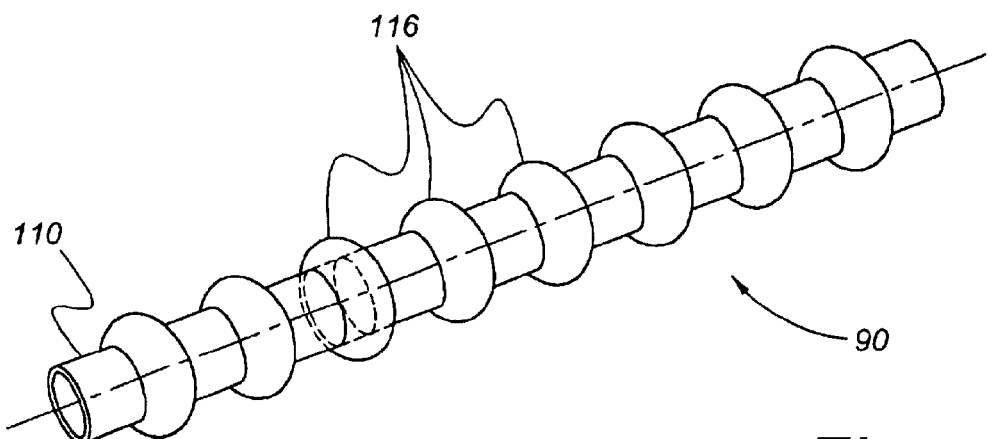
FIG. 2 is a perspective view of the isolator shown in FIG. 1.

As noted above, unwanted vibrational movement of torsion bar 50 is addressed by isolator 90. As shown in a first embodiment in FIGS. 1 and 2, isolator 90 is configured as a generally cylindrical resilient sleeve 110 formed from suitable elastomer or plastics. A plurality of generally annular ribs 116 extends radially outwardly from the generally cylindrical outer surface of sleeve 110. Isolator 90 is may be slidingly engaged with torsional reaction section 54, or insert molded to reaction section 54, or adhesively bonded to reaction section 54, or attached according to other methods and through the use of structures known to those skilled in the art and suggested by this disclosure. In any event, if torsion bar 50 is displaced excessively by vibratory road load inputs, annular ribs 116 will contact inner panel 74 of door 24, thereby preventing a hard metallic impact between torsion bar 50 and door 24. Those skilled in the art will appreciate in view of this disclosure that isolator 90 could be either pre-formed or molded in place upon torsion bar 50. Those skilled in the art will further appreciate in view of this disclosure that the present isolator could be employed with a torsion bar lift assist in which the torsion bar is not full-floating.

Figure 3:
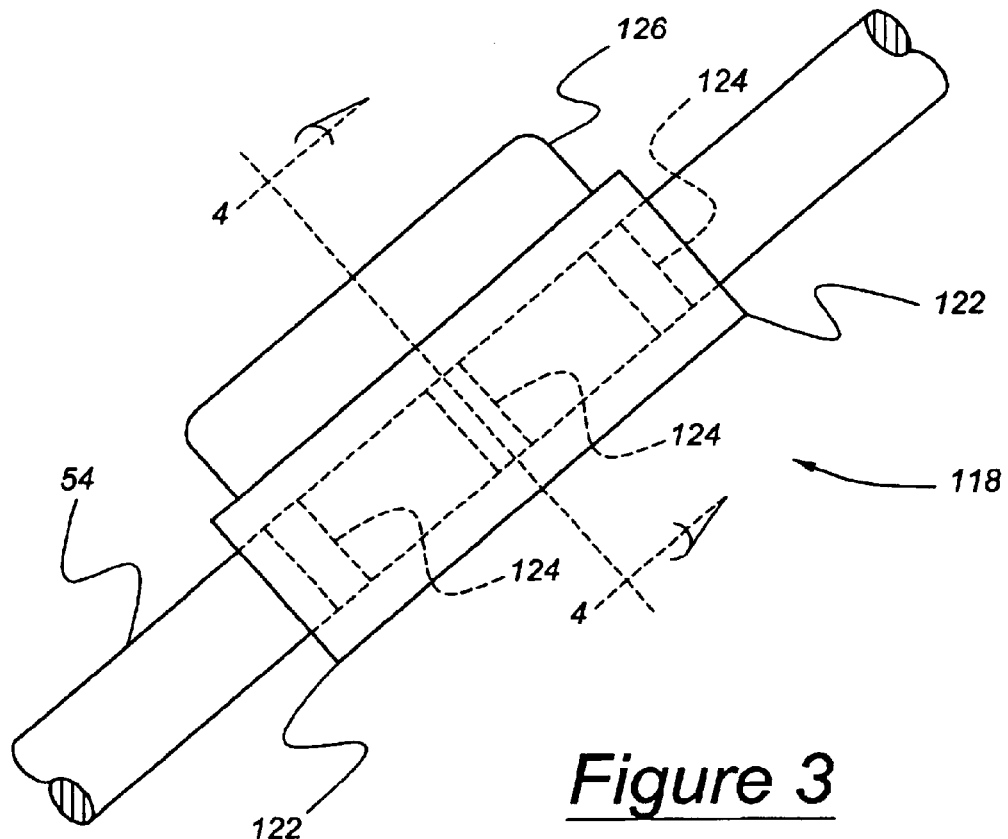
FIG. 3 is a perspective view of a second type of torsion bar isolator according to another aspect of the present invention.
Figure 4:
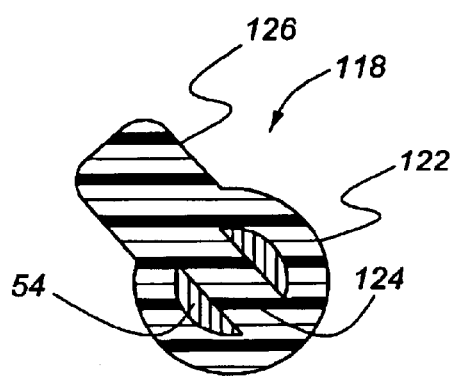
FIG. 4 is a sectional view of the torsion bar isolator of FIG. 3, taken along the line 4—4 of FIG. 3.
Figure 5:
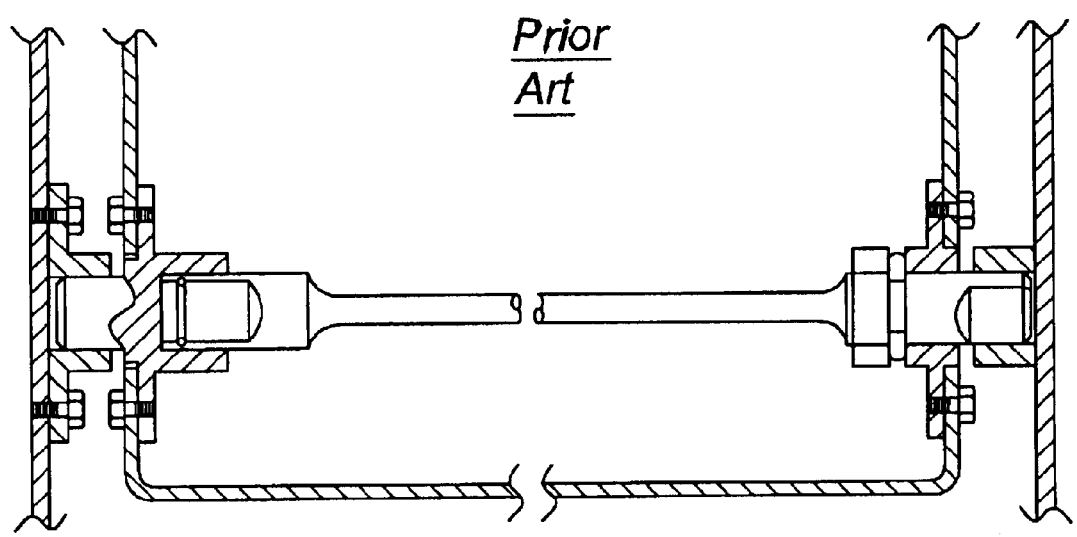
FIG. 5 illustrates a prior art tailgate assist system.

An example of a molded in place integral vibration damper is shown in FIGS. 3 and 4. Vibration damper 118 has a sleeve 122 which is through-molded to section 54 of torsion bar 50 by means of a plurality of diametral passages 124 formed in section 54. The through-molding assures that vibration damper 118 cannot rotate with respect to torsion bar 50. This in turn assures that non-circular snubber block 126 will remain in the selected design orientation with respect to either inner panel 74, or with respect to any other chosen strike area. Because this orientation is maintained by vibration damper 118, it is not necessary for snubber block 126 to completely circumscribe sleeve 122. Freed from this requirement, snubber block 126 may be formed as the illustrated non-circular segment. Vibration damper 118 may thus properly be termed to be integral vibration damping, because the required damping is contained upon the torsion bar itself, thereby obviating the need for additional sound deadening within the interior or exterior of door 24.

Although the present invention has been described in connection with particular embodiments thereof, it is to be understood that various modifications, alterations, and adaptations may be made by those skilled in the art with-out departing from the spirit and scope of the invention set forth in the following claims.

What is claimed is:

1. A closure panel for an automotive vehicle body, comprising:
 a door adapted to pivot about a generally horizontal pivot axis, with said door having a shell comprised of an outer panel joined with and spaced from an inner panel;
 a hinge half attached to a first end of said door;
 a first pivot post rigidly attached to said body and operatively engaged with said hinge half;
 a hinge bearing retainer attached to a second end of said door and having a bearing insert housed therein;
 a second pivot post rigidly attached to said body, with said second pivot post engaging said bearing insert such that said second pivot post and said bearing insert are rotationally locked;
 a torsion bar comprising a first end rotationally grounded to said shell of said door and a second end engaged with and rotationally locked with said bearing insert such that said torsion bar will be subjected to torsional loading as said door is pivoted; and
 a vibration isolator fitted along at least a portion of said torsion bar extending between said first and second ends, with said isolator comprising a generally cylindrical sleeve having a central passage for said torsion bar.

2. A closure panel according to claim 1, wherein said vibration isolator further comprises a plurality of generally annular ribs extending radially outwardly from an outer cylindrical surface of said sleeve.

3. A closure panel according to claim 2, wherein said generally annular ribs and said sleeve are molded integrally from elastomeric material.

4. A closure panel according to claim 1, wherein said vibration isolator comprises an elastomer molded about said torsion bar.

5. A closure panel according to claim 1, wherein said vibration isolator further comprises a plurality of generally annular ribs extending radially outwardly from an outer cylindrical surface of said sleeve, with said sleeve and said annular ribs being molded about said torsion bar.

6. A closure panel according to claim 1, wherein said sleeve comprises a plastics material molded about said torsion bar and having a plurality of integrally molded generally annular ribs extending radially outwardly from an outer surface of said sleeve.

7. A closure panel according to claim 1, wherein said sleeve extends along substantially the entire length of said torsion bar between said first and second ends.

8. A closure panel according to claim 1, wherein said isolator further comprises at least one non-circular snubber section molded upon an outer surface of said generally cylindrical sleeve.

9. A closure panel according to claim 8, wherein said vibration isolator is rotationally locked upon said torsion bar.

10. A closure panel according to claim 9, wherein said vibration isolator is adhesively bonded to said torsion bar.

11. A closure panel according to claim 9, wherein said vibration isolator is through-molded to said torsion bar.

12. A closure panel according to claim 1, wherein said torsion bar comprises a full-floating torsion bar.

13. An automotive vehicle having a closure panel comprising:
- a door adapted to pivot about a generally horizontal pivot axis, with said door having a shell comprised of at least one panel;
- a hinge half attached to a first end of said door;
- a first pivot post rigidly attached to said body and operatively engaged with said hinge half;
- a hinge bearing retainer attached to a second end of said door and having a bearing insert housed therein;
- a second pivot post rigidly attached to said body, with said second pivot post engaging said bearing insert such that said second pivot post and said bearing insert are rotationally locked;
- a torsion bar comprising a first end rotationally grounded to said shell of said door and a second end engaged with and rotationally locked with said bearing insert such that said torsion bar will be subjected to torsional loading as said door is pivoted; and
- an integral vibration damper fitted along at least a portion of said torsion bar extending between said first and second ends, with said vibration damper comprising a generally cylindrical elastomeric sleeve molded upon said torsion bar and having at least one snubber molded upon an outer surface of said sleeve such that said at least one snubber will contact said shell in the event that said torsion bar is subjected to vibratory forces of a predetermined magnitude arising from road load inputs to said vehicle.

14. A closure panel according to claim 13, wherein said at least one snubber comprises an annulus molded about the periphery of said elastomeric sleeve.

15. A closure panel according to claim 13, wherein said elastomeric sleeve is rotationally locked to said torsion bar, and with said snubber comprising a non-circular segment molded upon an outer surface of said sleeve such that said non-circular segment will contact a surface of said shell when said torsion bar is subjected to said vibratory force.

16. An automotive vehicle having a closure panel comprising:
- a door adapted to pivot about a generally horizontal pivot axis, with said door having at least one panel;
- a hinge half attached to a first end of said at least one panel;
- a first pivot post rigidly attached to said body and operatively engaged with said hinge half;
- a hinge bearing retainer attached to a second end of said door and having a bearing insert housed therein;
- a second pivot post rigidly attached to said body, with said second pivot post engaging said bearing insert such that said second pivot post and said bearing insert are rotationally locked;
- a torsion bar comprising a first end rotationally grounded to said at least one panel and a second end engaged with and rotationally locked with said bearing insert such that said torsion bar will be subjected to torsional loading as said door is pivoted; and
- an integral vibration damper fitted along at least a portion of said torsion bar extending between said first and second ends, with said vibration damper comprising a generally cylindrical elastomeric sleeve molded upon said torsion bar such that said elastomeric sleeve will contact said shell in the event that said torsion bar is subjected to vibratory forces arising from road load in-put to said vehicle.

* * * * *